United States Patent [19]

Hiramatsu et al.

[11] Patent Number: 4,645,964
[45] Date of Patent: Feb. 24, 1987

[54] VIBRATION WAVE MOTOR

[75] Inventors: Akira Hiramatsu; Hitoshi Mukohjima, both of Yokohama, Japan

[73] Assignee: Canon Kabushiki Kaisha, Tokyo, Japan

[21] Appl. No.: 717,435

[22] Filed: Mar. 28, 1985

[30] Foreign Application Priority Data

Apr. 2, 1984 [JP] Japan ................................. 59-65399

[51] Int. Cl.[4] ............................................ H01L 41/08
[52] U.S. Cl. .................................... 310/323; 310/328
[58] Field of Search ............... 310/323, 328, 330, 321, 310/331

[56] References Cited

U.S. PATENT DOCUMENTS

| 4,495,432 | 1/1985 | Katsuma et al. | 310/328 |
| 4,504,760 | 3/1985 | Yamamoto et al. | 310/328 X |
| 4,562,373 | 12/1985 | Tokusima et al. | 310/328 |
| 4,587,452 | 5/1986 | Okumura et al. | 310/323 X |

Primary Examiner—Patrick R. Salce
Assistant Examiner—Emanuel Todd Voeltz
Attorney, Agent, or Firm—Fitzpatrick, Cella, Harper & Scinto

[57] ABSTRACT

A motor which drives a movable member by a travelling vibration wave generated in a vibration member having electrostrictive elements arranged with a phase difference therebetween is disclosed. The electrostrictive elements are stacked in a lamination direction with the phase difference therebetween so that a contact area between the electrostrictive elements and the vibration member is increased and a high output and high efficiency drive is attained.

10 Claims, 11 Drawing Figures

VIBRATION WAVE MOTOR

BACKGROUND OF THE INVENTION

1. Field of the Invention

The present invention relates to a structure of a vibration motor which utilizes a travelling surface wave.

2. Description of the Prior Art

A vibration wave motor transduces a vibration motion created by application of a periodic voltage to electrostrictive elements to a rotational motion or a linear motion. Because it does not require windings as opposed to a conventional electromagnetic motor, it is simpler and smaller in structure and produces a high torque at a low rotating speed.

FIGS. 1 and 2 show a principle of drive in a prior art vibration wave motor. FIG. 1 illustrates the generation of the surface wave in the motor. Numeral 1 denotes a vibration member, and numerals 2a and 2b denote electrostrictive elements which are bonded or welded to the vibration member 1 (usually made of metal) and arranged on one side of the vibration member 1 with a spatial phase difference of λ/4 therebetween.

The vibration member 1 is used as one electrode for the electrostrictive elements 2a and 2b and an A.C. voltage $V=V_0 \sin \omega t$ is applied to the electrostrictive element 2a from an A.C. power supply 3a while an A.C. voltage $V=V_0 \sin (\omega t \pm \pi/2)$ having a phase difference of λ/4 is applied to the electrostrictive element 2b, where signs + and − are selected by a phase shifter 3b in accordance with a direction of movement of the movable member 5. Let us assume that the sign − is selected and the voltage $V=V_0 \sin (\omega t - \pi/2)$ is applied to the electrostrictive element 2b.

When only the electrostrictive element 2a is vibrated by the voltage $V=V_0 \sin \omega t$, a vibration by a standing wave is generated as shown in FIG. 1 (a), and when only the electrostrictive elements 2b is vibrated by the voltage $V=V_0 \sin (\omega t - \pi/2)$, a vibration by a standing wave is generated as shown in FIG. 1 (b). When the two A.C. voltages having the phase difference therebetween are simultaneously applied to the electrostrictive elements 2a and 2b, the surface wave travels.

FIGS. 1(A), 1(B), 1(C) and 1(D) show the surface waves at times $t=2n\pi/\omega$, $t=\pi/2\omega+2n\pi/\omega$, $t=\pi/\omega+2n\pi/\omega$ and $t=3\pi/2\omega+2n\pi/\omega$, respectively, and the wavefront travels in X-direction.

Such a travelling surface wave includes a longitudinal wave and a lateral wave. Looking at a mass point A of the vibration member 1 as shown in FIG. 2, a longitudinal amplitude u and a lateral amplitude w make a rotating elliptic motion.

A movable member 5 is press-contacted to the surface of the vibration member 1 and it contacts only an apex of the vibration member. (Actually, it makes contact in an area having a definite width.) Accordingly, the vibration member 5 is driven by the longitudinal amplitude component u of the elliptic motion of the mass points A, A', . . . at the apex and it moves in an arrow direction N.

When the phase of the voltage is shifted by 90° by the 90° phase shifter, the surface wave travels in -X-direction and the movable member 5 moves in the opposite direction to the direction N.

A velocity of the mass point A at the apex is $V=2\pi f u$ (where f is a vibration frequency) and a velocity of the movable member 5 depends thereon and also depends on the lateral amplitude w because of the frictional drive by the press-contact.

The velocity of the movable member 5 is proportional to the magnitude of the elliptic motion of the mass point A and the magnitude of the elliptic motion is proportional to the voltage applied to the electrostrictive elements. The magnitude of the elliptic motion is also proportional to the areas of the electrostrictive elements 2.

Accordingly, as the areas of the electrostrictive elements 2 increase, the rotation speed and the torque are increased. In actuality, as shown in FIG. 3, when the electrostrictive elements 2a and 2b have the same area and are arranged symmetrically, a vacant area of 3λ/4 is created because the electrostrictive elements 2a and 2b are arranged with the phase difference of λ/4 therebetween.

Accordingly, an area of one wavelength at minimum is available for drive.

When the areas of the electrostrictive elements 2a and 2b are not equal so that as much area as possible is utilized (either the electrostrictive element 2a or 2b is additionally arranged in the vacant area of 3λ/4 shown in FIG. 3 to increase the area available for drive), the area not available for drive is one half of that described above, that is, an area of one half wavelength. However, in this method, it is difficult to adjust the amplitude of the standing wave generated by the vibrations of the electrostrictive elements 2a and 2b and it is difficult to generate a stable travelling surface wave having a constant amplitude.

In actuality, since the travelling standing wave generated by the electrostrictive elements 2a and 2b is attenuated by the internal friction of the vibration member 1, the amplitude at a distant point from the excitation point is smaller and the motion of the mass point on the surface of the vibration member 1 periodically changes at a period of λ/2 with the position on the surface when the travelling surface wave is generated. Since the number of contact points A, A', . . . in FIG. 2 changes and the positions of the contact points vertically change, the contact area changes and hence the efficiency is lowered or a noise is created.

SUMMARY OF THE INVENTION

It is an object of the present invention to provide a high output and high efficiency motor by arranging a plurality of electrostrictive elements on a vibration member with a phase difference therebetween to increase a contact area between the electrostrictive elements and the vibration member.

It is another object of the present invention to provide a low wow, low noise, high output and high efficiency surface wave motor having a simple construction by bonding a plurality of ring-shaped electrostrictive elements each polarized around its circumference at a constant pitch, with a phase difference between the electrostrictive elements.

Other objects of the present invention will be apparent from the following description taken in conjunction with the drawings.

DETAILED DESCRIPTION OF THE PREFERRED EMBODIMENTS

Figure 4:
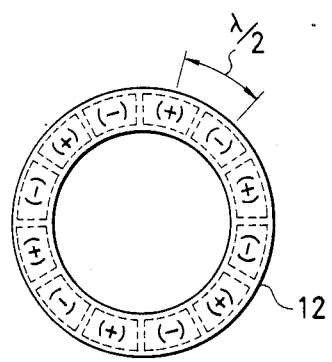
FIG. 4 is a plan view of electrostrictive elements used in a vibration wave motor of the present invention.
Figure 5:
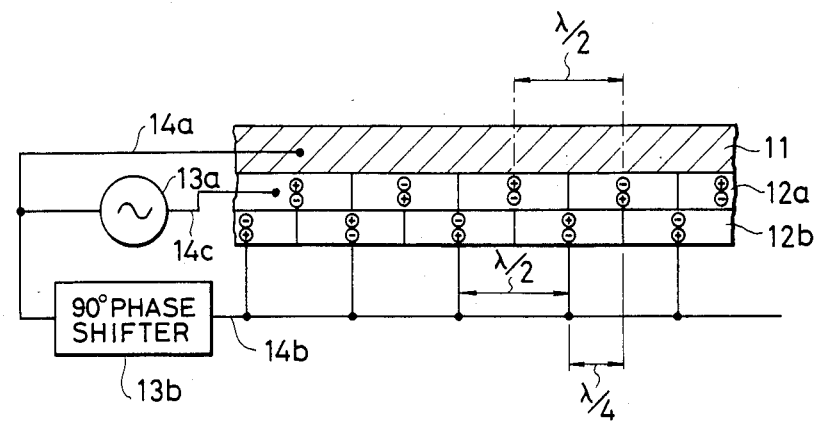
FIG. 5 is a conceptual view for illustrating a principle of drive of the vibration wave motor of the present invention.
Figure 6:
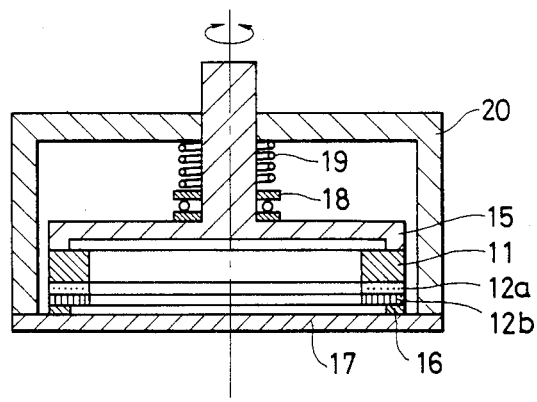
FIG. 6 is a sectional view of the vibration wave motor of the present invention.

FIGS. 4 to 6 show one embodiment of the motor of the present invention.

Figure 3:
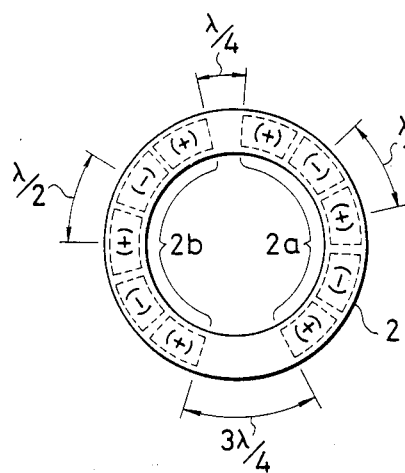
FIG. 3 is a plan view of electrostrictive elements used in a prior art motor.

FIG. 4 is a plan view of a ring-shaped electrostrictive element of the motor. As shown, the electrostrictive element is polarized at a constant pitch around its circumference. In FIG. 4, the number of waves around the circumference is six. The electrostrictive element 12 corresponds to one of the electrostrictive elements 2a and 2b shown in FIG. 3, and a pair of such electrostrictive elements 12 are arranged with a spatial phase difference of $\lambda/4$ therebetewen as shown in FIG. 5.

FIG. 5 is the diagram showing a relation between a vibration member 11 and a electrostrictive elements 12a and 12b which correspond to the electrostrictive element 12 shown in FIG. 4. They are bonded on one side of the vibration member 11 with the phase difference of $\lambda/4$.

Figure 1:
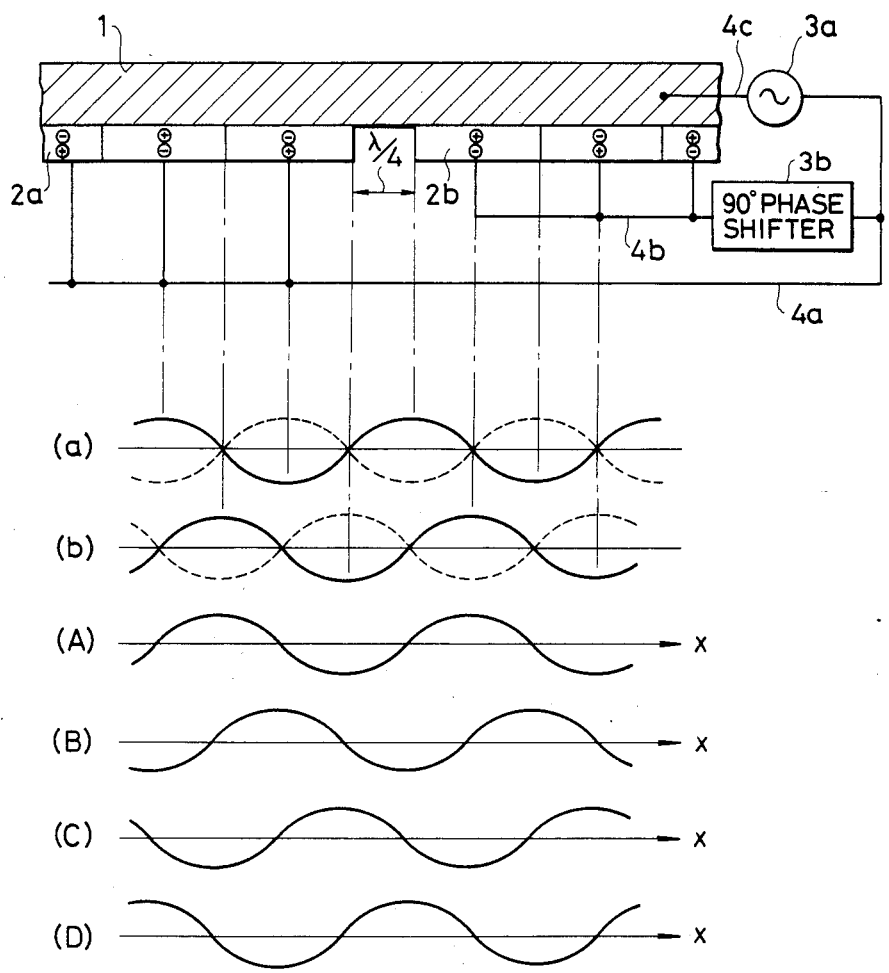
FIGS. 1 and 2 illustrate a principle of a vibration wave motor.
Figure 2:
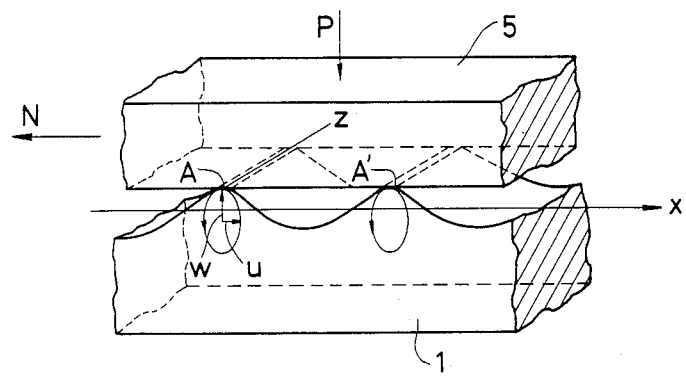

Numeral 13a denotes an A.C. power supply for driving the electrostrictive elements, and numeral 13b denotes a 90° phase shifter for generating a signal having a phase shift of $\pm\pi/2$ from the signal of the A.C. power supply 13a. Since the electrostrictive elements 12a and 12b are arranged on the vibration member 11 in the same manner as in FIG. 1, a travelling surface wave is generated in the vibration member 11.

FIG. 6 is a sectional view of the vibration wave motor according to the present invention. Numeral 15 denotes a rotor which is driven by the travelling surface wave of the vibration member 11, numeral 16 denotes a vibration absorber which holds the vibration member 11, numeral 17 denotes a motor support, numeral 18 denotes a thrust bearing which receives a pressure of a spring 19 which presses the vibration member 11, numeral 20 denotes an outer cylinder of the motor supported by the motor support 17, and numerals 12a and 12b denote the electrostrictive elements shown in FIG. 4, which are bonded to the vibration member 11 as shown in FIG. 5.

The vibration member 11 generates the travelling surface wave and the rotor 15 pressed by the spring 19 is driven and rotated by the surface wave.

Figure 7:
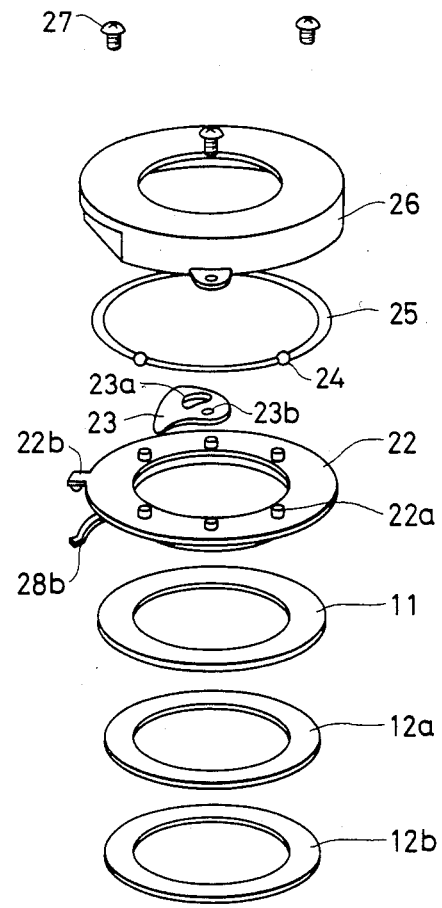
FIG. 7 is a developed perspective view of an iris unit in which the vibration wave motor of the present invention is used to drive an iris.
Figure 7:
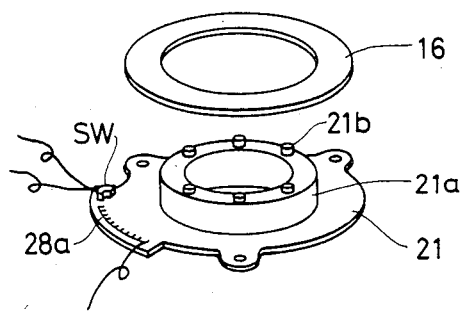

FIG. 7 is a perspective view of an iris unit in which the motor shown in FIG. 6 is used to drive a lens iris. Numerals 11, 12aa and 12b denote the vibration member and the electrostrictive elements arranged as shown in FIG. 5, numeral 16 denotes a vibration absorber which holds the vibration member 11, and numeral 21 denotes a holder for holding the vibration member 11. The vibration absorber 16, electrostrictive elements 12a and 12b and vibration member 11 are inserted, in this order, into a central cylinder 21a of the holder 21. Numeral 22 denotes a rotor which is driven by a travelling surface wave generated in the vibration member 11 and which is rotatably supported by the central cylinder 21.

Stop vanes 23 (only one of which is shown) are arranged on the rotor 22. A projection 22a of the rotor 22 and a projection 21b of the holder 21 engage with a slot 23a and a hole 23b, respectively, formed in the stop vane. The rotor 22 is press-contacted to the vibration member 11 by a spring (not shown) through the bearing 24 and the spacer 25, and an outer cylinder 26 is coupled to the holder 21 by bolts 27 to form the iris unit which is a portion of a lens barrel (not shown). The holder 21 has an arcuate comb electrode 28a arranged on its outer periphery. The comb electrode 28a contacts with a slider 28b which projects from the rotor 22 and produces a signal representative of a rotational position of the vibration member.

The rotor 22 is driven by the vibration member to open or close the stop vanes. The rotational position of the rotor 22 is detected by the electrode 28a, and when a predetermined rotational position is reached, the drive to the electrostrictive elements is stopped so that a desired aperture number is obtained.

Figure 8:
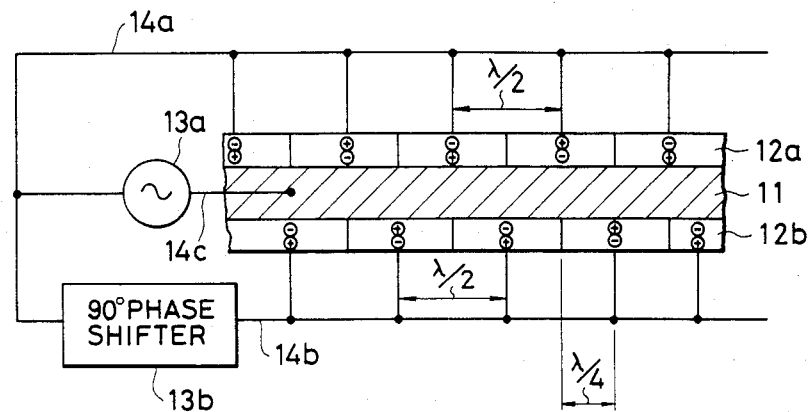
FIG. 8 is a conceptual view of another embodiment of the vibration wave motor of the present invention.

FIG. 8 shows another embodiment of the present invention. In the present embodiment, the electrostrictive elements 12a and 12b shown in FIG. 4 are bonded on both sides of the vibration member 11 with the phase difference of $\lambda/4$ therebetween. The travelling surface wave is generated in the same manner as in FIG. 5.

Figure 9:
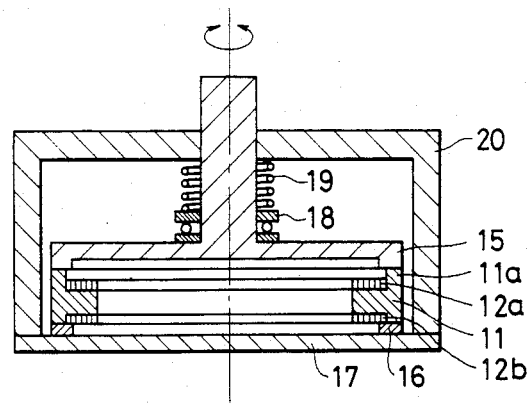
FIG. 9 is a sectional view of a structure of the motor shown in FIG. 8.

FIG. 9 is a sectional view of a motor having the vibration member 11 and the electrostrictive elements 12a and 12b arranged as shown in FIG. 8. The like elements in FIG. 9 to those shown in FIG. 6 are designated by the like numerals. The rotor 15 is press-contacted to the periphery 11a of the vibration member 11 and driven by the surface wave generated in the periphery 11a of the vibration member 11.

Figure 10:
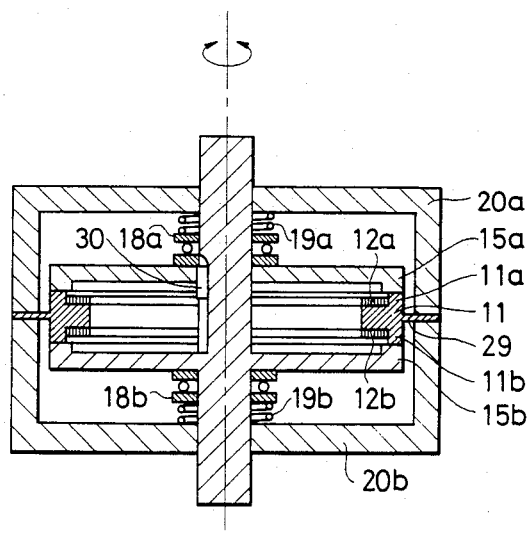
FIG. 10 is a sectional view of another embodiment of the vibration wave motor of the present invention.
Figure 11:
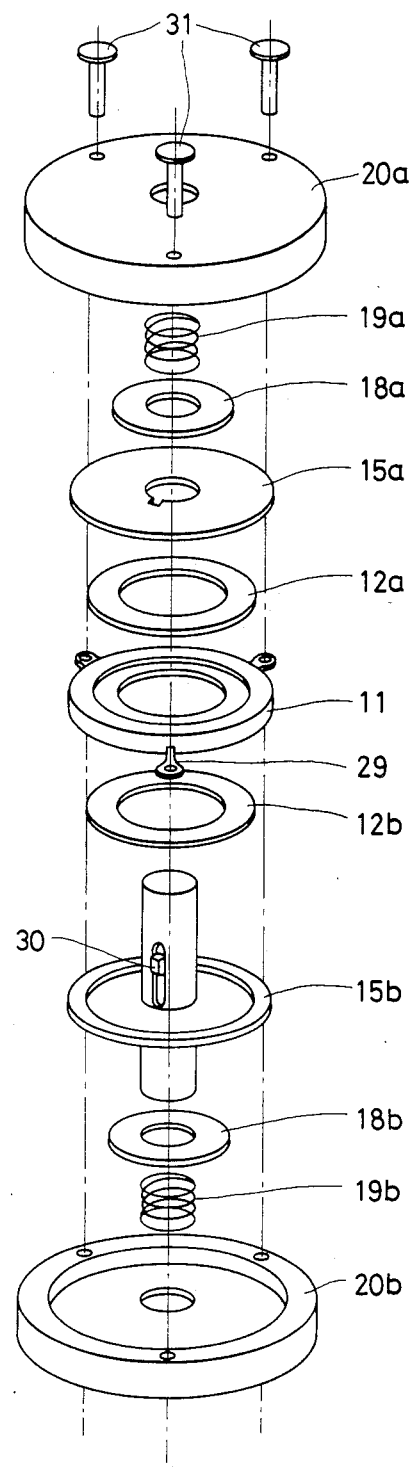
FIG. 11 is a developed perspective view of the motor shown in FIG. 10.

FIG. 10 is a sectional view of another embodiment of the motor which uses the drive principle shown in FIG. 8, and FIG. 11 is a perspective view thereof. The electrostrictive elements 12a and 12b are bonded to both sides of the vibration member 11 with the phase difference of $\lambda/4$ therebetween, and the rotors 15a and 15b are press-contacted to outer peripheries 11a and 11b of the vibration member 11, respectively, by springs 19a and 19b through thrust bearings 18a and 18b. The rotors 15a and 15b are coupled to each other through a key 30. The vibration member 11 is fixed to motor support outer cylinders 20a and 20b by bolts 31 and a support beam 29 having a smaller rigidity than the vibration member 11.

In the motor shown in FIGS. 10 and 11, the surface waves are generated in the outer peripheries 11a and 11b of the vibration member 11 so that the rotors 15a and 15b are driven.

In accordance with the present invention, the ring-shaped electrostrictive elements are polarized at a constant pitch around their circumferences and bonded to the vibration member with the predetermined phase difference therebetween. Accordingly, the area of the electrostrictive elements for exciting the vibration member is increased and the vibration member is excited around the entire periphery thereof. Thus, an amplitude variation of the travelling surface wave due to the attenuation of the vibration is eliminated and a low noise, high output and high efficiency motor is obtained.

In the embodiment in which the electrostrictive elements are bonded on both sides of the vibration member, the amplitude of the travelling surface wave at the contact area to the rotor is further increased so that the output and the efficiency are further improved. Since the electrostrictive elements of the same shape and same polarization are used, the construction of the electrostrictive elements is simple and a cost thereof is low, compared with the conventional motor having the same driving force.

In the above embodiments, two electrostrictive elements are used. When three electrostrictive elements are used, they are arranged with a phase difference of 120° and signals having a phase difference of 120° are applied thereto. When four electrostrictive elements are used, they are arranged with a phase difference of 45° and signals having a phase difference of 45° are applied thereto.

Although, in the above embodiments, the groups of the electrostrictive elements are arranged in parallel with each other, it is apparent that the similar effect can be also obtained even if the groups are not arranged in parallel each other, that is, the planes of the arrangement of the groups cross each other.

Further, although, in the above embodiments, the vibration energy is generated by the electrostrictive element, it is apparent that it is possible to employ a piezoelectric element, especially which has reversed piezoelectric effect, instead of the electrostrictive element.

What is claimed is:

1. A vibration wave motor comprising:
   (a) a ring-shaped vibration member having an outer peripheral portion of a first thickness and an inner peripheral portion of a second thickness, said vibration member having electrostrictive means provided on a first surface of said inner peripheral portion and on a second surface of said inner peripheral portion which is opposite to said first surface;
   (b) means for applying periodic signals having different phases respectively to said electrostrictive means provided on said first and second surfaces so that a travelling vibration wave is generated on a surface of said outer peripheral portion; and
   (c) a movable member contacting said surface of said outer peripheral portion in said vibration member, said movable member being rotated by the travelling vibration wave.

2. A vibration wave motor according to claim 1, wherein each of said electrostrictive means is arranged at a pitch of a predetermined fraction of wavelength of a vibration wave.

3. A vibration wave motor according to claim 1, wherein said electrostrictive means comprises at least one piezoelectric element.

4. A vibration wave motor according to claim 1, wherein the thickness of said inner peripheral portion is smaller than that of said outer peripheral portion.

5. A vibration wave motor comprising:
   (a) a ring-shaped vibration member having an outer peripheral portion of a first thickness and an inner peripheral portion of a second thickness, said vibration member having an electrostricture means on a first surface of said inner peripheral portion and on a second surface of said inner peripheral portion which is opposite to said first surface;
   (b) means for applying periodic signals having different phases respectively to said electrostrictive means, provided on said first and second surfaces so that a travelling vibration wave is generated on a surface of said outer peripheral portion;
   (c) a movable member contacting said surface of said outer peripheral portion in said vibration member, said movable member being rotated by said travelling vibration wave; and
   (d) a motor case member, said vibration member and said movable member being provided within said motor case member, said vibration member and said motor case member being fixed to each other with a support member which is less rigid than said vibration member.

6. A vibration wave motor according to claim 5, wherein each of said electrostrictive means is arranged at a pitch of a predetermined fraction of wavelength of a vibration wave.

7. A vibration wave motor according to claim 5, wherein said electrostrictive means comprises at least one piezoelectric element.

8. A vibration wave motor according to claim 5, wherein the thickness of said inner peripheral portion is less than that of said outer peripheral portion.

9. A vibration wave motor comprising:
   (a) a ring-shaped vibration member on which electrostrictive means are laminated in first and second surfaces of the vibration member;
   (b) means for applying periodic signals, having different respectively to said electrostrictive means provided on said first and second surfaces so that a travelling vibration wave is generated on a surface of an outer peripheral portion of said vibration member;
   (c) a movable member contacting said vibration member, said movable member being rotated by said travelling vibration wave; and
   (d) a hollow motor case member, said vibration member and said movable member being provided within the motor case member, said vibration member and said motor case member being fixed to each other with a support member which is less rigid than said vibration member.

10. A vibration wave motor according to claim 9, wherein said electrostrictive means comprises at least one piezoelectric element.

* * * * *